United States Patent
Igawa et al.

(10) Patent No.: US 7,207,594 B2
(45) Date of Patent: Apr. 24, 2007

(54) LEG PROTECTION DEVICE FOR VEHICLE OCCUPANT

(75) Inventors: Tadahiro Igawa, Shiga (JP); Tomohiro Sawa, Shiga (JP); Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 687 days.

(21) Appl. No.: 10/199,017

(22) Filed: Jul. 22, 2002

(65) Prior Publication Data

US 2003/0030255 A1 Feb. 13, 2003

(30) Foreign Application Priority Data

Aug. 10, 2001 (JP) .............................. 2001-244018

(51) Int. Cl.
*B60R 21/16* (2006.01)

(52) U.S. Cl. .................................................. 280/730.1

(58) Field of Classification Search .............. 280/730.1
See application file for complete search history.

(56) References Cited

U.S. PATENT DOCUMENTS

| | | | |
|---|---|---|---|
| 3,786,830 A | | 1/1974 | Owada |
| 4,290,627 A | * | 9/1981 | Cumming et al. ........... 280/729 |
| 5,306,043 A | * | 4/1994 | Mihm et al. ................. 280/732 |
| 5,324,070 A | * | 6/1994 | Kitagawa et al. ......... 280/730.1 |
| 5,360,231 A | * | 11/1994 | Adams ..................... 280/728.2 |
| 5,364,124 A | * | 11/1994 | Donegan et al. ......... 280/730.1 |
| 5,482,318 A | | 1/1996 | Sollars, Jr. |
| 5,584,508 A | | 12/1996 | Maruyama et al. |
| 6,196,585 B1 | * | 3/2001 | Igawa ..................... 280/743.1 |
| 6,250,669 B1 | * | 6/2001 | Ohmiya ...................... 280/732 |
| 6,460,878 B2 | * | 10/2002 | Eckert et al. ............. 280/730.1 |

FOREIGN PATENT DOCUMENTS

| | | |
|---|---|---|
| GB | 2 283 463 | 5/1995 |
| JP | 10-297402 | 11/1998 |
| JP | 10-315894 | 12/1998 |
| JP | 199 46 477 | 3/2001 |
| JP | 2001-138848 | 5/2001 |

* cited by examiner

*Primary Examiner*—Thomas Price
(74) *Attorney, Agent, or Firm*—Manabu Kanesaka

(57) ABSTRACT

A leg protection device for a vehicle occupant is disposed inside a seat-front member of a vehicle. The leg protection device includes an air bag having a rear panel and positioned along the seat-front member and a front panel facing the occupant when the air bag is inflated, and a gas generator for inflating the air bag. When the air bag is inflated, the air bag has a vertical length at a center portion of the front panel in the width direction longer than a vertical length at a center portion of the rear panel in the width direction to obtain a curved cross section.

9 Claims, 4 Drawing Sheets

LEG PROTECTION DEVICE FOR VEHICLE OCCUPANT

BACKGROUND OF THE INVENTION AND RELATED ART STATEMENT

The present invention relates to a leg protection device to protect lower legs of a vehicle occupant from hitting against an interior panel or the like in front of a seat in a case of, for example, a car collision.

In order to protect lower legs of a vehicle occupant from hitting against an interior panel in front of the seat when a high-speed moving object, such as a car, is involved in a head-on collision, some leg protection devices mainly include an air bag disposed inside the interior panel (in a space backside of the interior panel), a gas generator for inflating the air bag, and a lid for covering the air bag in a normal state (when the high-speed moving object is not involved in a collision).

In such leg protection devices, the air bag is folded and placed inside the interior panel in the normal state, and the lid is mounted so as to cover the folded air bag.

When the car or the like is involved in a head-on collision, the gas generator is actuated to expel gas, and the expelled gas is supplied to the air bag, thereby rapidly inflating the air bag. In this case, the lid is opened as the air bag expands, and the air bag is inflated to protrude from the interior panel and deploy between the interior panel and the lower legs of the occupant so as to protect the lower legs from the interior panel.

In most cases, the interior panel as a seat-front member in the car or the like is convexly curved toward an interior of a vehicle compartment in section in a vertical direction. In such a case of the curved interior panel, when the air bag is inflated and deployed between the interior panel and the legs, a large gap is sometimes formed between the air bag and the interior panel.

An object of the present invention is to provide a leg protection device for the vehicle occupant, in which an air bag is inflated and deployed along a seat-front member, such as the interior panel, without a large gap between the seat-front member and the airbag even when the seat-front member is convexly curved toward the interior of the car cabin.

Further objects and advantages of the invention will be apparent from the following description of the invention.

SUMMARY OF THE INVENTION

A leg protection device for a vehicle occupant of the present invention includes an air bag disposed inside a seat-front member and having a rear panel positioned along the seat-front member and a front panel facing the occupant when the air bag is inflated, and a gas generator for inflating the air bag. When the air bag is inflated, the air bag has a vertical length at a center portion in the width direction of the front panel longer than a vertical length at a center portion in the width direction of the rear panel.

In such a leg protection device for the vehicle occupant, when the air bag is inflated, the rear panel is concavely curved because a center portion in the width direction of the front panel of the air bag extends farther than the rear panel in the vertical direction. As a result, even when the seat-front member is convexly curved toward the cabin interior, the air bag is deployed without a large gap between the curved seat-front member and the airbag.

In the present invention, it is preferable that the front panel has a tucked portion so that the length in the vertical direction of the center portion in the width direction of the front panel becomes larger than the length in the vertical direction of the center portion in the width direction of the rear panel. In this case, when inflated, the air bag is shaped along a curved surface of the seat-front member so that a center portion of the front panel reliably extends farther and the rear panel is concavely curved.

DETAILED DESCRIPTION OF THE PREFERRED EMBODIMENT

Figure 1:
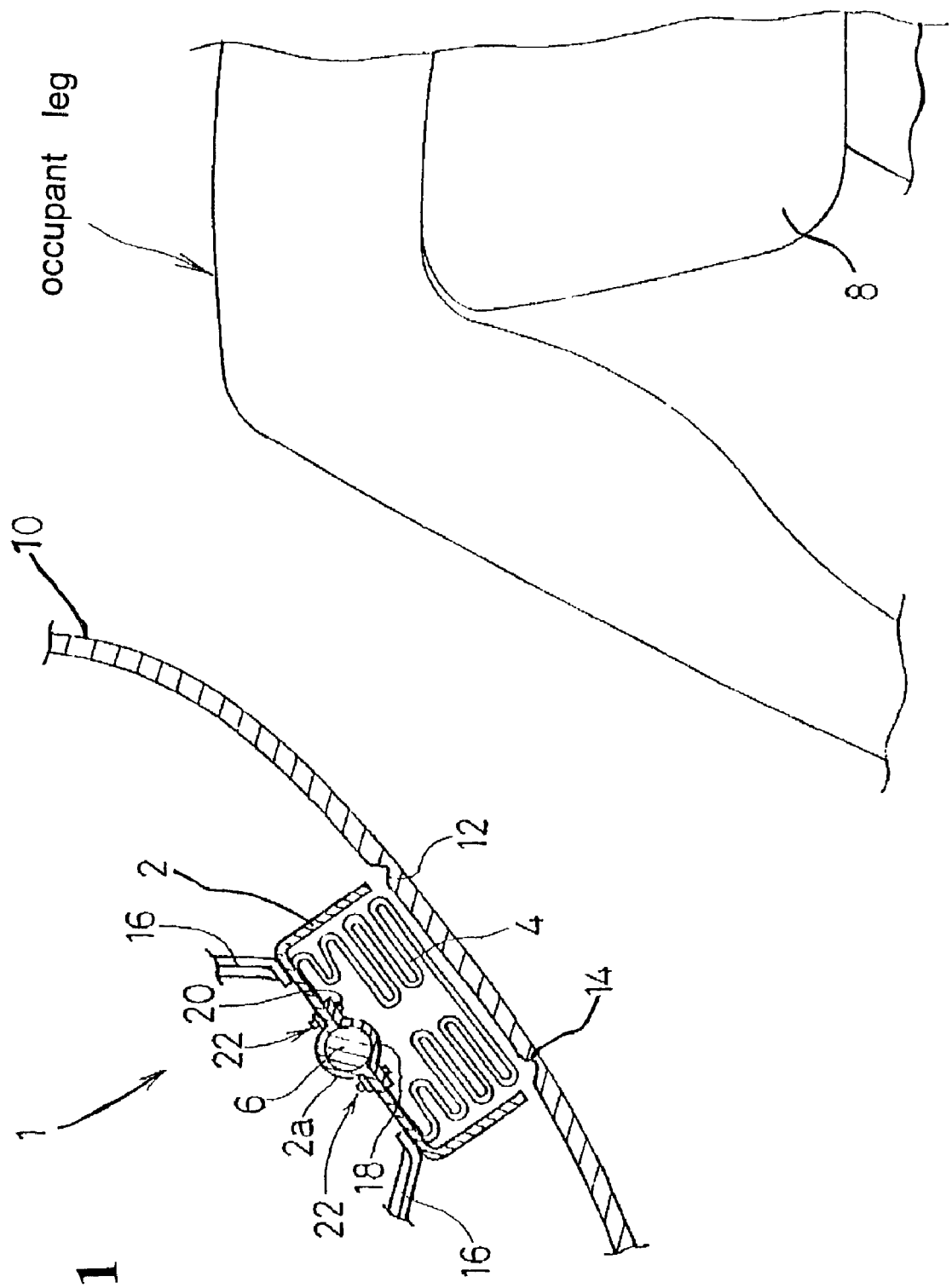
FIG. 1 is a longitudinal sectional view showing a normal state in front of a passenger's seat in a car having a leg protection device for protecting a vehicle occupant according to an embodiment of the present invention.
Figure 2A:
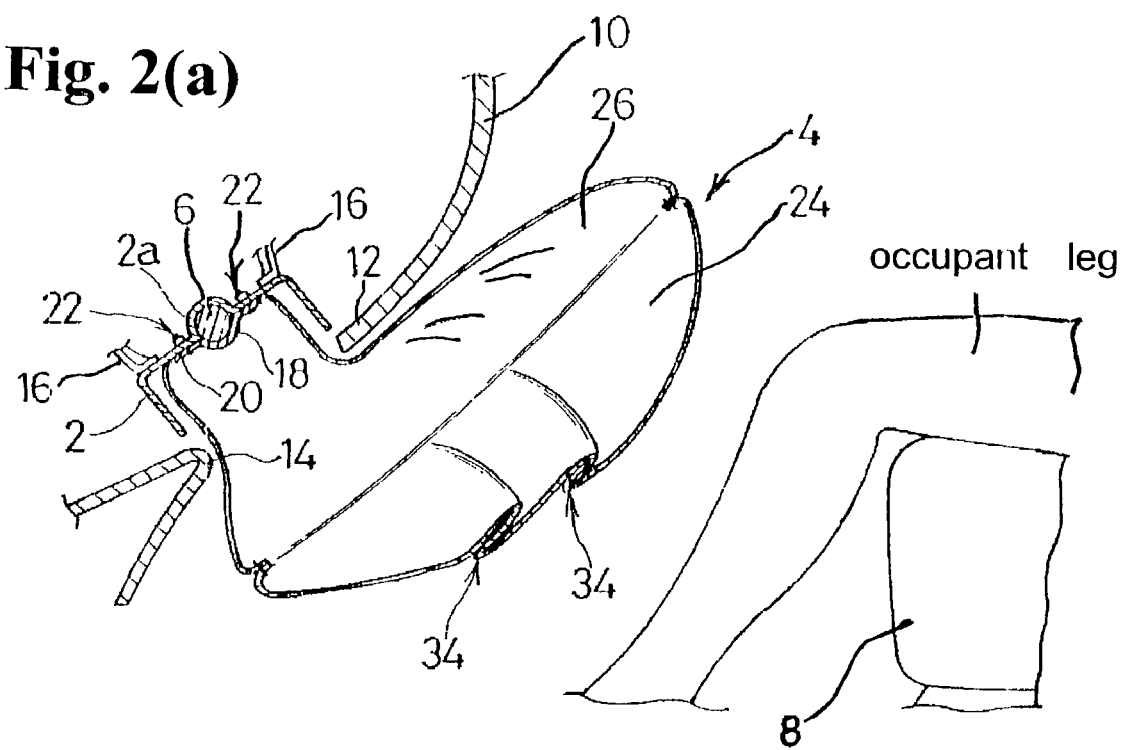
FIGS. 2(a) and 2(b) are longitudinal sectional views in front of the passenger's seat in the car having the leg protection device shown in FIG. 1 when an air bag is inflated.
Figure 2B:
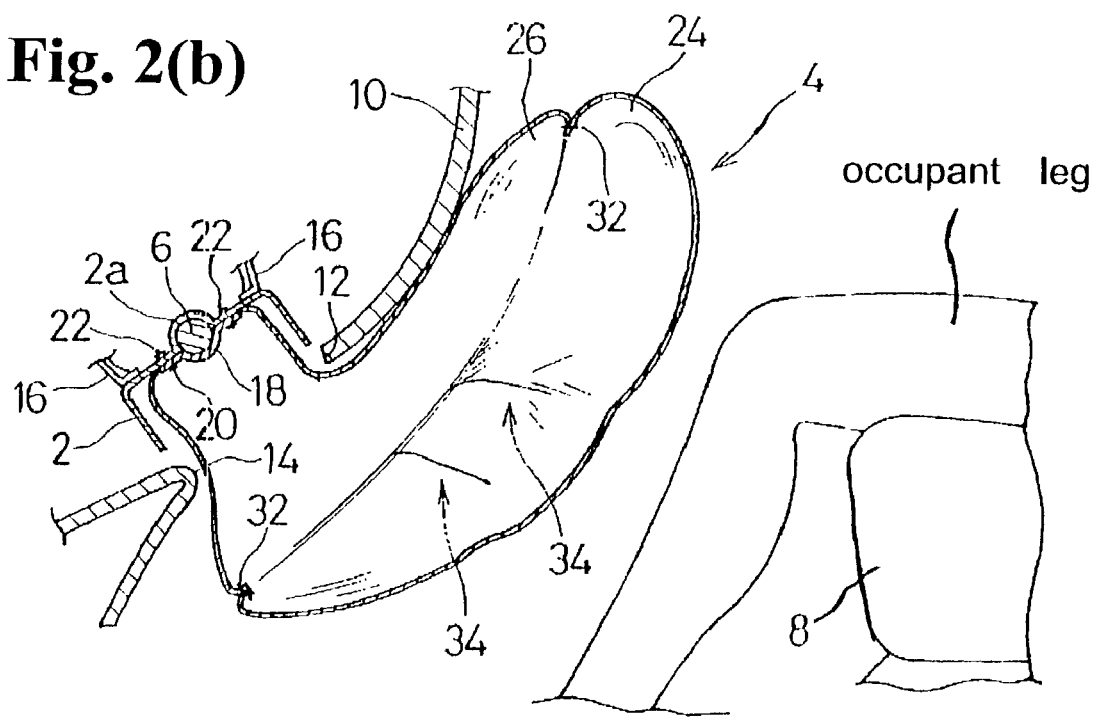
Figure 3:
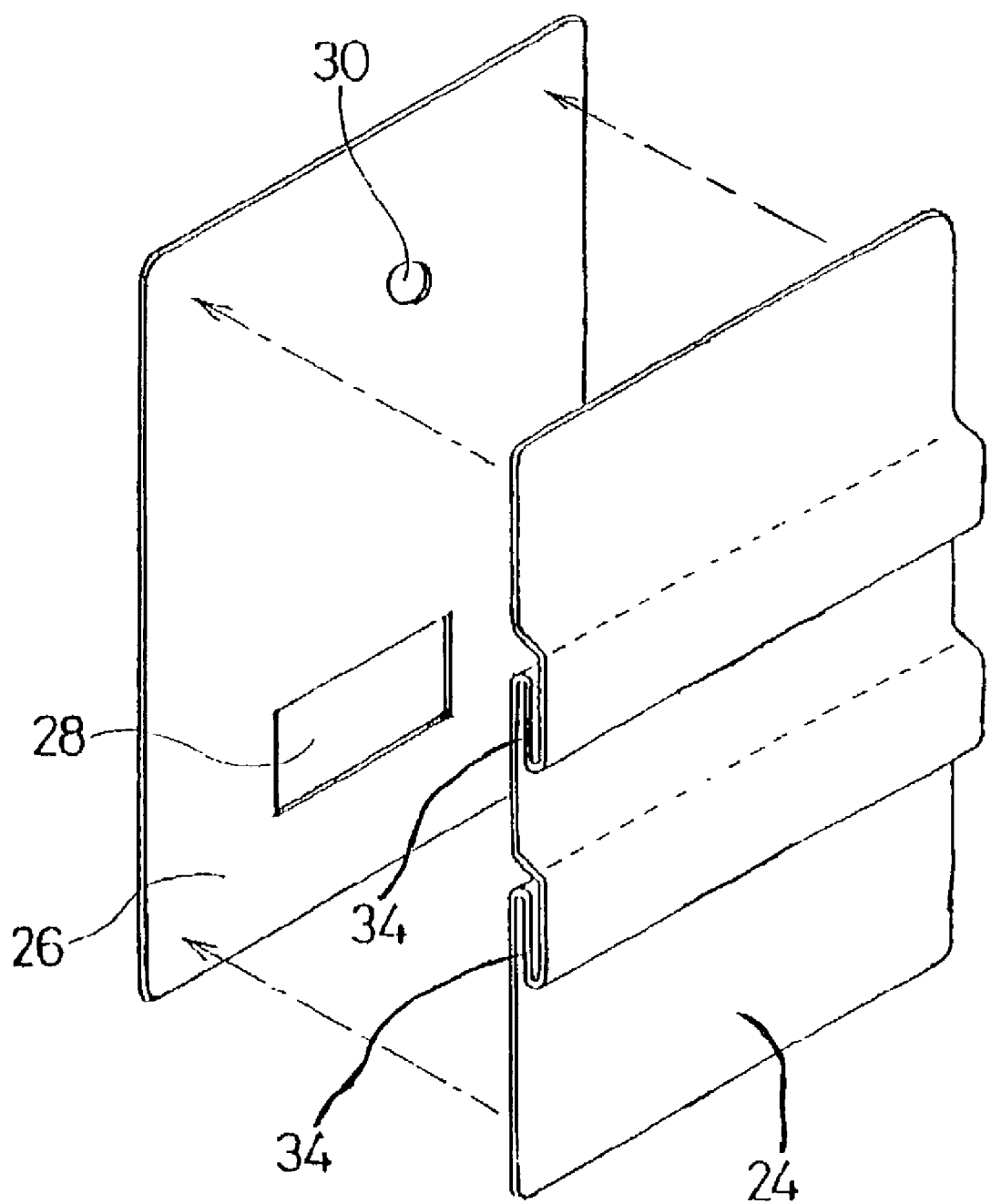
FIG. 3 is an exploded perspective view of the air bag shown in FIG. 1.
Figure 4A:
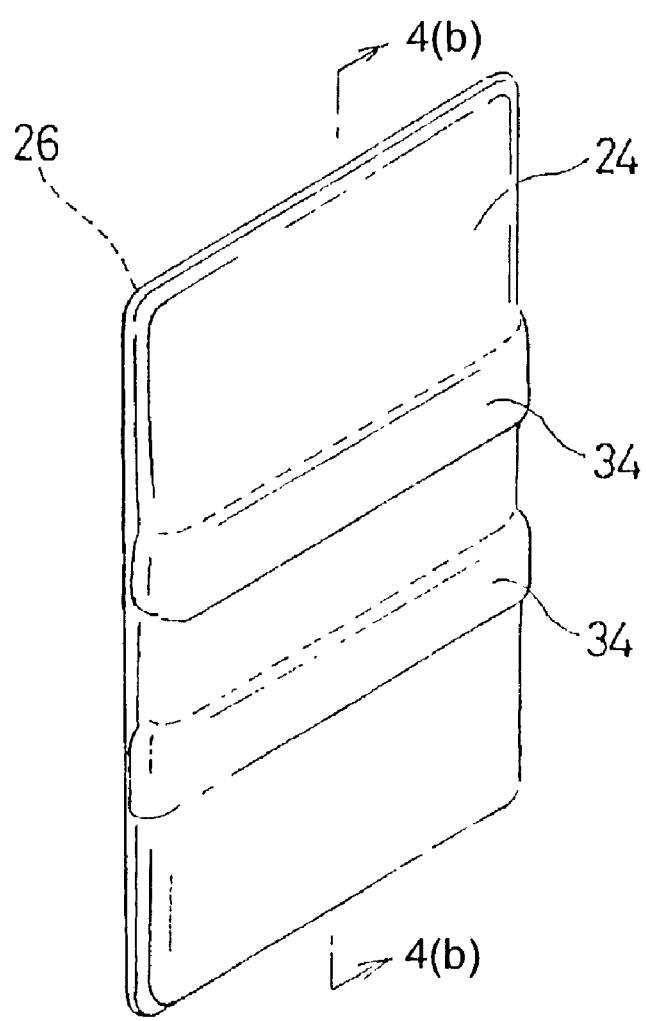
FIG. 4(a) is a perspective view of the air bag shown in FIG. 1.
Figure 4B:
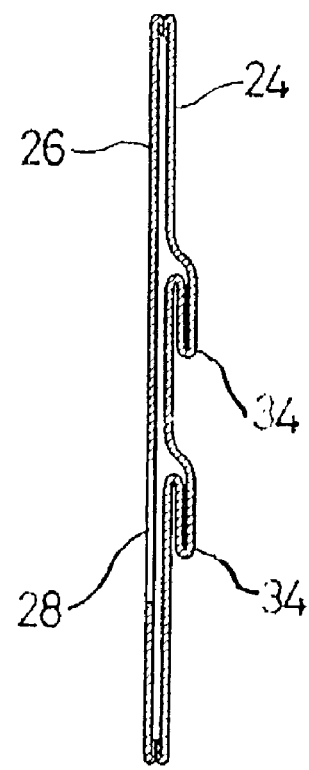
FIG. 4(b) is a sectional view taken along line 4b—4b in FIG. 4(a).

Hereunder, embodiments of the present invention will be described with reference to the accompanied drawings. FIG. 1 is a longitudinal sectional view showing a normal state of a car in front of a passenger's seat, which has a leg protection device for a vehicle occupant according to an embodiment of the present invention. FIGS. 2(a) and 2(b) are longitudinal sectional views shown in FIG. 1 when the air bag of the leg protection device is inflated, respectively, showing a state in which the air bag of the leg protection device is being inflated, and a state in which the inflation of the air bag is almost completed. FIG. 3 is an exploded perspective view of the air bag, FIG. 4(a) is a perspective view of the air bag as a final product, and FIG. 4(b)) is a sectional view, taken along line 4b—4b in FIG. 4(a).

A leg protection device 1 for a vehicle occupant 1 includes a retainer 2 formed in a container shape and having an opening at front thereof (a surface facing the occupant); an air bag 4 accommodated in the retainer 2 in a folded state; and a gas generator 6 for inflating the air bag 4. The front opening of the retainer 2 is covered with an interior panel 10 placed in front of a passenger's seat 8 and serving as a seat-front member. The interior panel 10 is convexly curved toward an interior of vehicle cabin in a longitudinal cross section (a cross section along a surface vertical to the longitudinal direction of the vehicle).

A lid area defined by a groove tear line (a tear-expediting portion) 12 and a hinge portion 14 (a bending-inducing portion) is formed at a height equivalent to a sitting surface of the passenger's seat 8 on a backside of the interior panel 10 (a surface of the interior panel 10 opposite to a surface facing the occupant). The tear line 12 extends along upper, right and left side edges of the lid area. The hinge portion 14 extends along a lower edge of the lid area. The retainer 2 is placed inside the interior panel 10 so that the front opening thereof is aligned with the lid area, and is fixed to a car-body member (not shown) via brackets 16.

A lid may be formed in a part separated from the interior panel 10 instead of being formed integrally with the interior panel 10.

When the air bag 4 is inflated by gas from the gas generator 6 to press the lid area of the interior panel 10 from the inside of the interior panel 10, the tear line 12 is torn along the upper edge and both the right and left side edges thereof. The lid area is bent at the hinge portion 14 along the lower edge, and an upper part thereof is thereby turned like a flap, and is opened out toward the front side (an occupant side) of the interior panel 10.

The gas generator 6 has a substantially cylindrical shape in this embodiment. The gas generator 6 is fitted in a recess 2*a* formed on a bottom surface of the retainer 20 along a half of circumference thereof, and is fixed to the bottom surface of the retainer 2 by a pressing member 18 attached at the other side of the half thereof. The pressing member 18 has a flange-shaped presser plate 20 that extends so as to surround the recess 2*a* along the bottom surface of the retainer 2, and is fixed to the bottom surface of the retainer 2 by fixtures 22, such as bolts and nuts, via the presser plate 20. The structure and placement of the gas generator 6 are not limited to the above.

As shown in FIGS. 3, 4(*a*) and 4(*b*), the air bag 4 is composed of two panels, namely a front panel 24 on an occupant side and a rear panel 26 on an opposite side. The rear panel 26 has an opening 28 for receiving the gas from the gas generator 6, and a vent hole 30. The front panel 24 and the rear panel 26 are substantially rectangular panels, and a length in a vertical direction of the front panel 24 is larger by a predetermined length than a length in a vertical direction of the rear panel 26. The opening 28 is placed at a lower half of the rear panel 26 in the vertical direction, and the vent hole 30 is placed at an upper half thereof. A length in a horizontal direction of the front panel 24 and a length in a horizontal direction of the rear panel 26 are substantially the same.

The front panel 24 and the rear panel 26 are sewn together with a sewing thread 32 at peripheral portions (see FIG. 2(*b*)), thereby forming the air bag 4 in a bag shape.

When sewing the peripheral portion of the front panel 24 and the peripheral portion of the rear panel 26, tucked portions 34 are formed in advance by overlapping adjoining portions in a middle of the front panel 24 in the vertical direction without binding the portions in order to reduce the length in the vertical direction of the front panel 24. The tucked portions 34 reduce the vertical length of the front panel 24 to be substantially equal to the vertical length of the rear panel 26. In this state, the front panel 24 and the rear panel 26 are aligned, and the peripheral portions thereof are sewn together with the sewing thread 32.

In this case, the tucked portions 34 are folded on the front surface of the front panel 24, as shown in FIG. 3, and the edges of the front panel 24 in the vertical direction included in the tucked portions 34 are also sewn with the sewing thread 32 together with the edges of the other portions of the front panel 24 in the vertical direction.

In this embodiment, the front panel 24 has two tucked portions 34. The peripheral portions of the front panel 24 and the rear panel 26 connected by the sewing thread 32 are placed inside the air bag 4 as a final product.

The air bag 4 is placed such that when inflated, the vertical directions of the front panel 24 and the rear panel 26 are substantially vertical, and the above-described half of the rear panel 26, in which the gas-admission opening 28 is disposed, is arranged at a lower position. The air bag 4 is connected to an interior of the retainer 2 as the peripheral portion of the gas opening 28 is clamped between the presser plate 20 of the pressing member 18 and the bottom surface of the retainer 2.

When the car with the leg protection device 1 of such a configuration is involved in a head-on collision, the gas generator 6 is actuated to inject the gas into the air bag 4, and the air bag 4 starts to expand. As the air bag 4 expands, the lid area of the interior panel 10 is pushed to open, and the air bag 4 protrudes toward the front side of the interior panel 10.

Subsequently, as an internal pressure of the air bag 4 increases, and a tension produced in a planar direction of the front panel 24 and the rear panel 26 increases, the adjoining portions in the vertical direction of the front panel 24, which overlap at the tucked portions 34, are separated by the planar tension, and are deployed in the vertical direction of the front panel 24. For this reason, the front panel 24 spreads out in the vertical direction so that it becomes larger than the rear panel 26, and the air bag 4 is inflated and deployed along the interior panel 10 so that the front panel 24 is curved toward the rear panel 26 due to the difference of the vertical lengths of the front panel 24 and the rear panel 26. As a result, the air bag 4 is deployed along the interior panel 10, as shown in FIG. 2(*b*).

In the leg protection device 1, since the air bag 4 is deployed from the height at the sitting surface of the passenger's seat 8 to the upper part of the interior panel 10 while being curved toward the rear panel 26 along the interior panel 10, it can cover a wide area of the interior panel 10. Furthermore, since the air bag 4 is deployed without a large gap between the interior panel 10 and the airbag, even when the legs of the occupant heavily hit the air bag 4, the air bag 4 is supported by the interior panel 10 at the rear panel 26, and can reliably receive the legs. In addition, since the air bag 10 is inflated and deployed along the interior panel 10, it is prevented from being excessively protruded toward the occupant.

Although the front panel 24 has two tucked portions in the above embodiment, it may have one or more than three tucked portions. The tucked portions may be formed at the positions other than those illustrated.

For example, the front panel 24 may be made of a material that elongates easily in the vertical direction (in the vertical direction when mounted in the vehicle or the like) more than the rear panel 26, so that it extends farther than the rear panel 26 in the vertical direction and the air bag 4 is curved along the rear panel 26 when inflated. In such a structure, the tucked portions 34 may be omitted.

While the air bag 4 is composed of the front panel 24 and the rear panel 26 that are substantially rectangular in the above embodiment, the panels 24 and 26 may have other shapes, such as a circle, an ellipse, or a rectangle that is long sideways.

While the tucked portions 34 are arranged to be extended in the horizontal direction of the front panel 24 in the above embodiment, they may be extended in the vertical direction of the front panel 24, depending on a shape of the interior panel 10 and the vehicle layout. The tucked portions 34 may be placed in both the horizontal direction and the vertical direction of the front panel 24, so that the air bag 4 is inflated while the side of the rear panel 26 is almost caved in.

As described in detail above, the present invention provides the leg protection device that allows the air bag to be inflated and deployed along the seat-front member, such as the interior panel, without a large gap from the seat-front member even when the seat-front member is convexly curved toward the interior of the vehicle compartment.

While the invention has been explained with reference to the specific embodiments of the invention, the explanation is illustrative and the invention is limited only by the appended claims.

What is claimed is:

1. A leg protection device for protecting legs of a vehicle occupant from colliding a seat-front member of a vehicle, comprising:

a gas generator to be disposed inside the seat-front member for generating gas, and an air bag connected to the gas generator and having a front panel for facing the occupant, and a rear panel to be positioned along the seat-front member when the air bag is inflated, said front panel having a tucked portion extending along a lateral direction of the air bag so that when the air bag is inflated, the tucked portion at a center portion of the front panel is stretched outwardly to have a vertical length of the center portion longer than that of the rear panel.

2. A leg protection device according to claim 1, wherein said tucked portion is an overlapped portion of a part of the front panel directly secured together at the side portions of the front panel.

3. A leg protection device according to claim 2, wherein said overlapped portion is connected to the rear panel along peripheries of the front and rear panels.

4. A leg protection device according to claim 3, wherein the vertical length of the front panel with the tucked portion is substantially same as that of the rear panel before the air bag is inflated.

5. A leg protection device according to claim 1, wherein said center portion extends vertically, and side portions sandwich the center portion and extend vertically.

6. A leg protection device according to claim 5, wherein in the tucked portion, a part of the front panel is overlapped when the air bag is formed.

7. A leg protection device according to claim 6, wherein the tucked portion of the front panel is fixed to the rear panel at the side portions.

8. A leg protection device according to claim 7, wherein the part of the front panel overlapped when the air bag is formed and located between the side portions is stretched outwardly at the center portion.

9. A leg protection device according to claim 1, wherein a plurality of tucked portions is formed on the front panel to be spaced apart from each other.

* * * * *